United States Patent [19]

de Valroger

[11] 4,027,213

[45] May 31, 1977

[54] ELECTRONIC SWITCHING ARRANGEMENT FOR ENERGIZING ELECTRIC MOTORS

[76] Inventor: Pierre Albert Marie de Valroger, 15 rue de Presles, 75015 Paris, France

[22] Filed: Mar. 18, 1975

[21] Appl. No.: 559,553

[30] Foreign Application Priority Data

Mar. 28, 1974 France .............................. 74.10824
Feb. 27, 1975 France .............................. 75.06118

[52] U.S. Cl. ............................... 318/138; 318/171; 318/227
[51] Int. Cl.² ....................................... H02K 29/00
[58] Field of Search .......... 318/138, 171, 227, 230, 318/231

[56] References Cited

UNITED STATES PATENTS

| | | | |
|---|---|---|---|
| 3,406,325 | 10/1968 | Rosa .............................. | 318/227 X |
| 3,423,662 | 1/1969 | Schlabach et al. ............. | 318/227 X |
| 3,662,247 | 5/1972 | Schieman ...................... | 318/231 X |
| 3,775,652 | 11/1973 | Bowler et al. .................. | 318/231 X |
| 3,819,992 | 6/1974 | Opal et al. .......................... | 318/171 |

Primary Examiner—Gene Z. Rubinson
Attorney, Agent, or Firm—William R. Woodward

[57] ABSTRACT

An electronic commutation circuit for feeding from a direct-current source an electric motor consisting of a stator with a polyphase winding and a magnetized rotor coupled mechanically with a position and angular speed sensor, comprises for each phase of the stator winding a transistor switching circuit, the operation of the switching circuits being sequentially controlled from signals received from the sensor in such a way that the various phases of the stator winding are fed by a system of polyphase bidirectional currents of substantially sinusoidal form rising and falling in steps, the frequency and phase angle of these currents being determined by the speed of the rotor and by its position relative to the stator. Each of the switching circuits is preceded by an electronic trigger with three stable positions and which delivers a positive, zero or negative voltage to provide control of the binary state of the associated commutation circuit.

29 Claims, 18 Drawing Figures

| $Y_{2n-1}$ | $Y_{2n}$ | Led n | Led n' | Ln |
|---|---|---|---|---|
| 0 | 1 | ✶ | · | + |
| 1 | 0 | · | ✶ | − |
| 1 | 1 | · | · | 0 |

ELECTRONIC SWITCHING ARRANGEMENT FOR ENERGIZING ELECTRIC MOTORS

BACKGROUND OF THE INVENTION

This invention relates to an electronic switching arrangement for energizing from a direct-current source an electric motor of the type consisting of a stator with a polyphase winding and a permanently magnetised rotor coupled mechanically with a position and angular speed sensor more particularly, the arrangement is of the kind comprising, for each phase of the stator winding, a switching circuit including, for example, a pair of thyristors or a pair of power transistors, preferably of complementary type, which are preceded by a pair of amplifying transistors coupled in parallel by their bases and by their emitters, and the operation of the various switching circuits being sequentially controlled from signals received from the sensor in such a way that the various phases of the stator winding are fed by a system for polyphase bidirectional currents of substantially sinusoidal appearance rising and falling in steps, at a rate of 12 steps per cycle in the case of a three-phase system, the frequency and phase angle of each of these currents thus being determined by the speed of the rotor of the motor and by its position relative to the stator.

PRIOR ART

An electronic switching arrangement of this kind has already been described by Applicants, more especially in their French Pat. No. 2,216,711 of 2nd Feb. 1973, of which the Application arose out of the conversion into an independent Patent of a Certificate of Addition to their earlier French Pat. No. 1,535,489 of 21st Apr. 1967.

In an electronic switching arrangement of this kind, the use of an inductive sensor associated with or incorporated in the motor to generate signals which represent the speed and relative position of its rotor and which may be used for sequentially controlling the circuits of the electronic switching arrangement controlling the motor, has the advantage of simplicity and relatively low cost. On the other hand, it has the disadvantage of being able effectively to perform its function only from a certain threshold value of the rotor speed which, strictly speaking, is relatively low but which, in certain cases, can be sufficiently high to prevent starting of the motor, above all in cases where the motor has to be started under load. Electronically commutated d.c. motors are often called "brushless d.c. motors" or BDCMs.

OBJECT OF THE INVENTION

One of the objects of the present invention is to obviate the threshold disadvantage just described and to improve the electronic switching arrangement of the kind in question in such a way as to enable the motor which it controls to start without hesitation by developing a torque equal to or at least approaching its maximum torque as soon as voltage is applied and throughout the entire duration of its increase in speed.

BRIEF SUMMARY OF THE INVENTION

According to one aspect of the invention, this object is achieved by virtue of the fact that each of the switching circuits of an electronic switching arrangement of the kind defined above is preceded by an electronic trigger with three stable positions which delivers a positive, zero or negative voltage, depending on the signals, applied to it, so as to ensure control on a three level basis of the associated switching circuit. The inputs of these various triggers are simultaneously stimulated by the signals emanating from the position and angular speed (inductive) sensor of the rotor of the motor and by those of a sequential excitation stage of relative low frequency whose operation is independent of the position and speed of the rotor and respond to the combined effect of these signals. The effect of the sequential excitation stage on the triggers is confined to the period of starting and initial acceleration of the motor and is supplanted by the effect of the sensor from a predetermined speed value. This sequential excitation stage which, by virtue of the interposition of the electronic triggers, only has to supply control signals of very low strength, thus replaces the inductive sensor in the lower speed range where the inductive sensor is substantially inoperative, and is then supplanted by the inductive sensor when the speed of the rotor reaches a sufficiently high value to allow its intervention. In addition, the use of electronic triggers with three stable positions makes it possible to obtain, from signals of low strength, full, reliable control of the switching circuits which control the current delivered to the various phases of the stator winding of the motor.

The position and angular speed sensor of the rotor of the motor defines as it were the switching program and, in combination with the sequential excitation stage and the electronic triggers collectively referred to hereinafter as "static commutator", provides for kinematic storage of the switching program, whose intervention expressly presupposes rotation of the motor.

FURTHER FEATURES OF THE INVENTION

In a first embodiment of the invention, which uses discrete and/or integrated electronic components and which is particularly applicable in the case of an inductive position and angular speed sensor which supplies its information in analogue form, each of the electronic triggers may consist of two pairs of transistors, preferably of complementary type, the transistors of the input stage being coupled in parallel by their bases and their emitters, whilst those of the output stage have their collectors together to the output of the trigger and their emitters connected respectively to the two terminals of a d.c. voltage source, a resistor arranged between the common point of the collectors of the output transistors and that of the bases of the input transistors providing for the feedback required for the trigger effect. At least two of these electronic triggers may have their inputs connected respectively to the two terminals of the d.c. voltage source by passive components, such as for example capacitors or resistors, whose function is to cause the triggers to make an initial movement when voltage is applied to enable the motor to start in the required direction of rotation. By establishing an initial polarisation of the triggers, these passive components, under the effect of voltage, create a dissymmetry in the positions of the various triggers without which the motor could not start. In addition to the passive components referred to above, the low-frequency sequential excitation stage may comprise delay circuits consisting of groups of resistors and capacitors, with one group per trigger, each of these groups consisting of two series resistors arranged between the common point of the bases of the input transistors of one trigger and the common point of the collectors of the output transistors of the preceding or following trigger, and of a capacitor connected between the common point of said resistors and an insulated junction point with the capacitors of the other group. It should be understood that these various structures represent only one possible embodiment of the invention amongst many others and should not in any way be interpreted as the scope of the invention.

Another object of the invention is to eliminate the need to use an inductive position and angular speed sensor, and to form a true static memory which enables switching to be processed both during controlled starting of the motor and during its established operation.

In a second embodiment of the invention, which is particularly applicable in the case of numerically controlled motors for machine tools, this object is achieved by virtue of the fact that the sequential excitation stage is formed by integrated logic circuits which receive their control signals in the form of unidirectional pulses or "bits", and by virtue of the fact that the position and angular speed sensor of the rotor is itself designed to supply its information in digital form. Suitable logic circuits are, in particular, counters and decoders, shift registers or even PROM memories, this list being by no means complete. So far as the sensor is concerned, it may with advantage be of a type other than inductive, more especially optical, thus enabling the multiple possibility of electron optics to be utilised. In such an embodiment of the invention, the integrated logic circuits may be arranged into a group whose inputs are supplied with signals emanating from the sensor and whose outputs act on an interface performing the function of the triggers with three stable positions. The outputs of such a group of integrated logic circuits thus follow three pairs of lines, the signals emitted by the group along each of these lines being rectangular in shape with two levels, the width of the intervals which represent these signals being a whole multiple of the duration of a bit, and a single change in signal level in one of the six lines corresponding to each bit. The interface which performs the function of the triggers with three stable positions, being formed for example by optoelectric couplings, receives at six inputs the two-level signals emanating from the group of integrated logic circuits and delivers at 3 outputs signals with three states or levels, namely "+", "0" and "−".

BRIEF DESCRIPTION OF DRAWINGS

Other features and advantages of the invention will become apparent from the following description of two preferred embodiments given purely by way of example and with reference to the accompanying drawings, wherein:

FIG. 17 is a longitudinal section and FIG. 17b a diagrammatic perspective view of the shaft and magnetized rotors of another form of motor use with the circuit of FIG. 3 instead of the motor of FIGS. 4a and 4b.

DESCRIPTION OF EMBODIMENTS

Figures 1, 3:
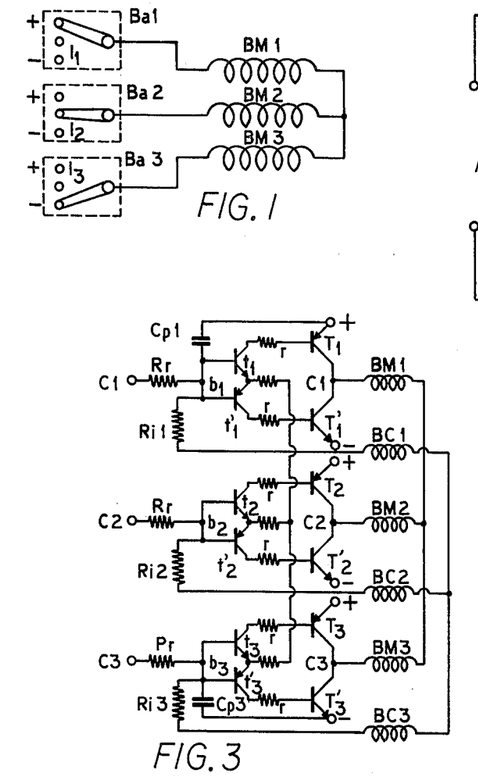
FIG. 1 is a basic circuit diagram illustrating the operation of the electronic triggers with three stable positions.
FIG. 3 shows an assembly of three triggers feeding the three motor windings of a motor switch by electromotive forces generated in three sensor windings of an induction sensor.

With the sole object of enabling the invention to be more readily understood, FIG. 1 shows the three windings of the stator coil, the so-called "motor coils" BM1, BM2 and BM3 in a star connection. Their free ends are successively connected to the + and − terminals of the feed source by the set of levers 11, 12 and 13 which may turn into any one of three positions.

The three corresponding assemblies schematise three triggers Ba1, Ba2 and Ba3, of which the levers may occupy three positions, the two end positions corresponding to a "feed" state, whilst the central position does not produce any feed.

The various possible combinations represent three ways of feeding each motor coil in one direction and three in the other. It can readily be seen that there are twelve possible configurations of the assembly.

To put the invention into practice, the current connections indicated above are formed by combinations of semi-conductors. In a first embodiment of the invention, which is based on the use of transistors, the simplest trigger 1a may be formed by four associated transistors, as shown in the plan view of FIG. 2.

Figure 2:
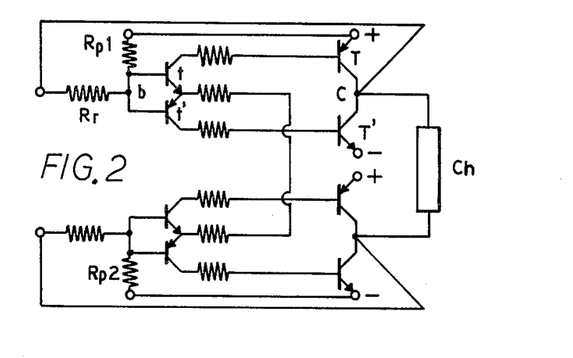
FIG. 2 illustrates one embodiment of the electronic triggers with three stable positions and shows how to connect two of them to feed a predetermined load.

This trigger comprises two so-called complementary power transistors T and T' and two amplification transistors t and t', which are also complementary. The bases of t and t' are connected at b, so that the base currents have to flow in the same direction. It follows that, if t is saturated, t' is blocked and vice versa.

In terms of pure switching, therefore, there can only be three possible combinations for the power transistors, namely:

T saturated and T' blocked,
T blocked and T' saturated,
T blocked and T' blocked.

The blockings and saturations are the result of the presence of a feedback circuit comprising a resistor Rr which connects the common collector C of the transistors T and T' to the common base b of the transistors t and t'. When conduction begins, it is caused to go to saturation by virtue of the feedback, which justifies the use of the term "trigger".

It two triggers are associated, as indicated in FIG. 2, it is possible to feed a load Ch in one direction or the other, or not to feed it at all. The load is not necessarily fed when voltage is applied, although the corresponding stage has little stability and the least action results in triggering in one direction or the other.

To ensure that triggering takes place in the required direction, it is possible to use polarisation resistors, such as Rp1 and Rp2, connected to the common bases of each of the triggers and, on the other hand, to the + and − terminals, as illustrated in FIG. 2. In this figure, the upper transistor T, of the pnp type, is thus saturated at the same time as the lower transistor T' of the npn type. The current flows downwards in Ch.

In order to switch the feed voltage of a three-phase stator, it is possible to associate three triggers similar to those shown in FIG. 2, the corresponding connection being shown in FIG. 3. The three loads which may thus be fed are the three star-connected motor coils BM1, BM2 and BM3. The various components of each of the three triggers bear the indices 1, 2 and 3, respectively, except for some whose values are identical and which do not have any index; c' is the case of the resistors r and the three feedback resistors Rr.

Figure 17A:
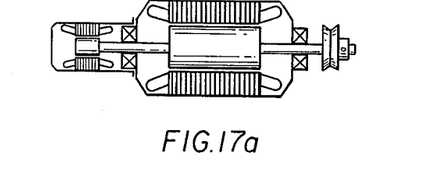
Figure 17B:
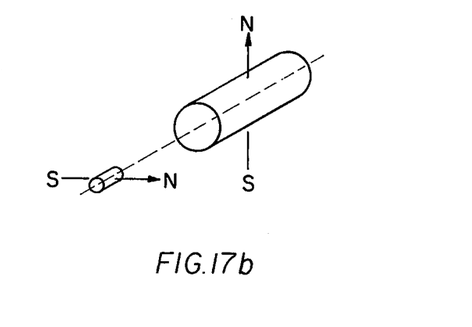

Commutation of the voltage of the motor may thus be controlled from a three-phase inductive sensor consisting of a rotor and a stator similar to the rotor and stator of the motor as shown in FIG. 17a and 17b. In FIG. 3, the three corresponding windings BC1, BC2 and BC3 are star-connected, and their free ends are connected respectively to the common bases b1, b2 and b3 forming the inputs of the triggers.

The circuit arrangement shown in FIG. 3 bears only an apparent similarity to the circuit arrangement previously described by Applicants in their French Pat. No. 2,216,711, because the way in which it works is in fact very different. Whereas, in this earlier Application, the transistors T and T' are only progressively saturated because a certain current has to be supplied to the bases of the transistors t and t'; which in turn presupposes that a certain speed of rotation has been reached, it can be seen that, in the present circuit arrangement and by virtue of the presence of the triggers used in accordance with the invention, the power transistors cannot have any intermediate state between blocking and saturation. Accordingly, saturation is produced suddenly and directly by virtue of the on-off control assumed by the triggers once a certain threshold speed has been cleared. On the one hand, therefore, intervention of the inductive sensor is sudden and the torque may thus be maximum beyond a relatively low threshold speed. On the other hand, the inductive sensor is no longer required to supply current to the bases of the amplification transistors as in the above-identified French patent, but only to release a sensitive trigger, so that both the power and the size of this sensor may be greatly reduced. It is for this reason that in FIG. 3 resistors Ri1, Ri2 and Ri3, whose values may reach a few hundred kilo-ohms, are arranged between the sensor windings BC1, BC2 and BC3 and the common bases b1, b2 and b3.

The motor may be started by initially polarising at least two of the triggers, as explained above. If the rotor has a suitable angular lead at rest, this polarisation produces an initial rotation. If is sufficient for this rotation to be greater than that corresponding to the response threshold of the sensor for the motor to continue rotation under the effect of its initial starting.

In FIG. 3, polarisation is no longer obtained by the resistors Rp, as in FIG. 2. Instead, it is obtained by capacitors Cp which have certain advantages over resistors in different cases. In addition, it is often possible to use capacitors shunted by resistors. In this case, two capacitors Cp1 and Cp3, arranged respectively between the + and − terminals on the one hand and the common bases b1 and b3 on the other hand, produce the conduction of T1 and T'3, i.e. the supply of current to BM1 and BM3 in the opposite direction.

Figure 4A:
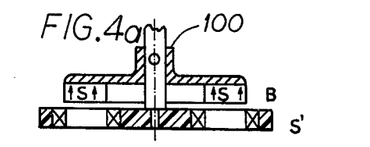
FIGS. 4a and 4b show one example of a motor of flat structure without any iron comprising three motor windings and three sensor windings.
Figure 4B:
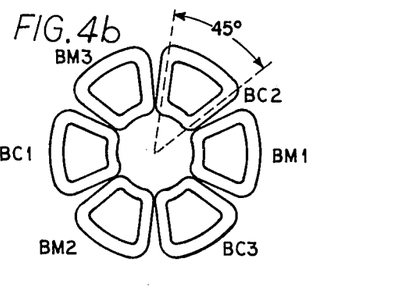

It would seem opportune at this stage to recall what the windings BM and BC discussed above consist of. This is demonstrated by a simple example, namely a motor of flat structure without any stator iron illustrated in FIGS. 4a and 4b.

In this example, the rotor consists of a plate 100 of ferromagnetic material keyed to the vertically arranged drive shaft to which is cemented a toroidal ring B of hard ferrite axially magnetised in equal sectors so as to form 8 symmetrically distributed alternate magnetic poles N, S, N, S, . . . . The upper view in FIG. 4a, which is a section through the axis of the rotor, thus shows two diametrically opposite poles S. Opposite the magnetic poles N and S, which thus travel in a horizontal plane, is situated the stator consisting of six trapezoidal coils accommodated in an insulating base S' shown in section in the upper view of FIG. 4a. Each coil has an angular opening of 45°, the coils being symmetrically distributed as shown in the lower view in FIG. 4b. Each sensor coil is thus comprised between two motor coils, and these coils BC and BM face one another when they have the same index, as indicated in the Figure.

Figure 5:
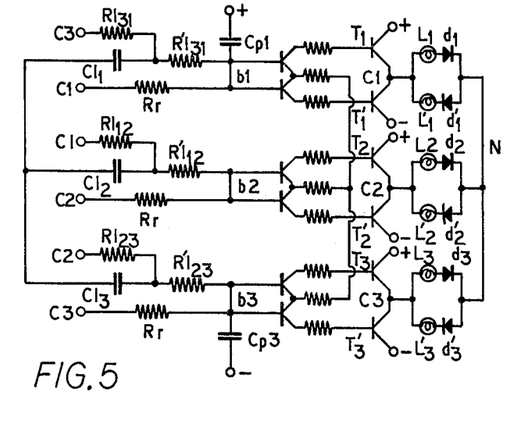
FIG. 5 illustrates one embodiment of a sequential excitation stage which may be used in association with the triggers for starting the motor.

To enable the motor to start under load and to begin its increase in speed by supplying an appreciable torque, possibly even approaching its maximum torque, until the speed threshold mentioned above, beyond which the inductive sensor intervenes, is cleared, a low-frequency sequential excitation circuit is used to control the triggers in this very low speed range, forming with the triggers what may be referred to as a "static commutator". FIG. 5 shows the corresponding circuit arrangement in the form of a preferred, buty by no means limiting embodiment. In this embodiment, the sequential excitation arrangement uses three delay circuits. With the sole object of enabling its mode of operation to be better understood by resorting to an analogy taken from the visual realm, the loads, normally consisting of three motor coils, have been replaced by three pairs of lamps L connected to three pairs of diodes d connected in the opposite direction in each phase and the lighting of these lamps in successive configurations illustrates the stages of the switching cycle. The indices which L and d bear correspond to the three phases. The three delay circuits consist respectively of the following three groups of resistors and capacitors: R $^1$31, R$'^1$ $^{31}$ and C $^1$1 on the one hand, R $^1$12, R$'^1$ 12 and C $^1$2 on the other hand, and finally R $^1$23, R$'^1$23 and C$^1$3.

When supply is established, the phases 1 and 3 switch-over (relaxation oscillation) under the action of the capacitors Cp1 and Cp3, as previously explained. The lamps L1 and L'3 are energized and also shine. The two successive configurations may be denoted No. 1 and No. 2. The two oscillations effected constitute the initial startup. When it is obtained, C1 and b1 are positive, whilst C3 and b3 are negative.

If the second trigger, then in the median position, is considered, it can be seen that a current circulates from C1 to b2 across the resistors R $^1$12 and R$'^1$12, the effect of this current being to render b2 positive. This effect is obtained with a certain delay because the capacitor C $^1$2 has to charge. When it has charged, the phase 2 oscillates make T2 conductive. The current flowing through T1 and now through T2 closes the circuit by passing through T'3. This produces configuration No. 3 characterised by illumination of the lamps L1, L2 and L'3, the last being the brightest.

If the first trigger, still in the end position, is considered, it can be seen that, due to the negative polarity of C3, a current flows from b1 to C3 across the resistors R$'^1$31 and R $^1$31. The effect of this current is to change the polarity of b1 from positive to negative. However, the capacitor C$^1$ 1 has to discharge, which causes a delay. In addition, before becoming negative, the potential of b1 becomes zero, which places the first trigger in the median position. T1 is no longer conductive and the only illuminated lamps are in phases 2 and 3. L2 and L'3 therefore shine. This is configuration No. 4.

By continuing the above reasoning, it can be seen that each of the three common bases b1, b2 and b3 is alternately positive and negative, as explained hereinafter.

Figure 6:
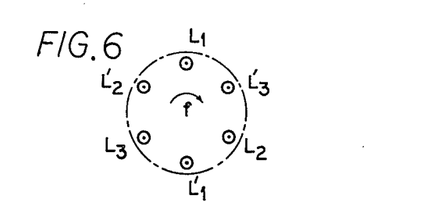
FIG. 6 diagrammatically illustrates the visualisation, by means of a light rose, of the operation of the sequential excitation stage.

This is confirmed by experience and, if the six lamps are arranged in a rose as shown in FIG. 6, the lamps L1, L'3, L2, L'1, L3, L'2 successively light up and go out in an overlapping sequence, corresponding to the 12 switching configurations. These illuminations and extinctions are reflected in luminous rotation in the direction of the arrow f.

Figure 7:
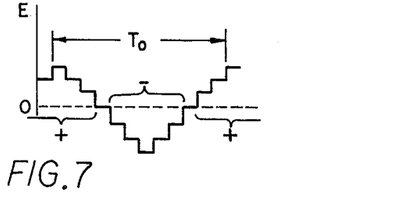
FIG. 7 specifies the ratios of the voltage stages obtained.

If the variation in voltage between a common collector, for example C1, and the neutral point N, is shown on a graph, the twelve voltage stages of FIG. 7 are obtained, the period being To. Similar pictures would be obtained with C2 and C3, being offset along the horizontal axis (time axis) by one third of the period. Of the twelve configurations, there are five where the collector C is positive and five where it is negative.

To carry out the combination thus obtained, it would seem to be of advantage to separate the "commutation" part from the "power commutation" part. This is shown in the developed diagram of FIG. 8 related to a first embodiment of the electronic switching arrangement according to the invention.

Figure 8:
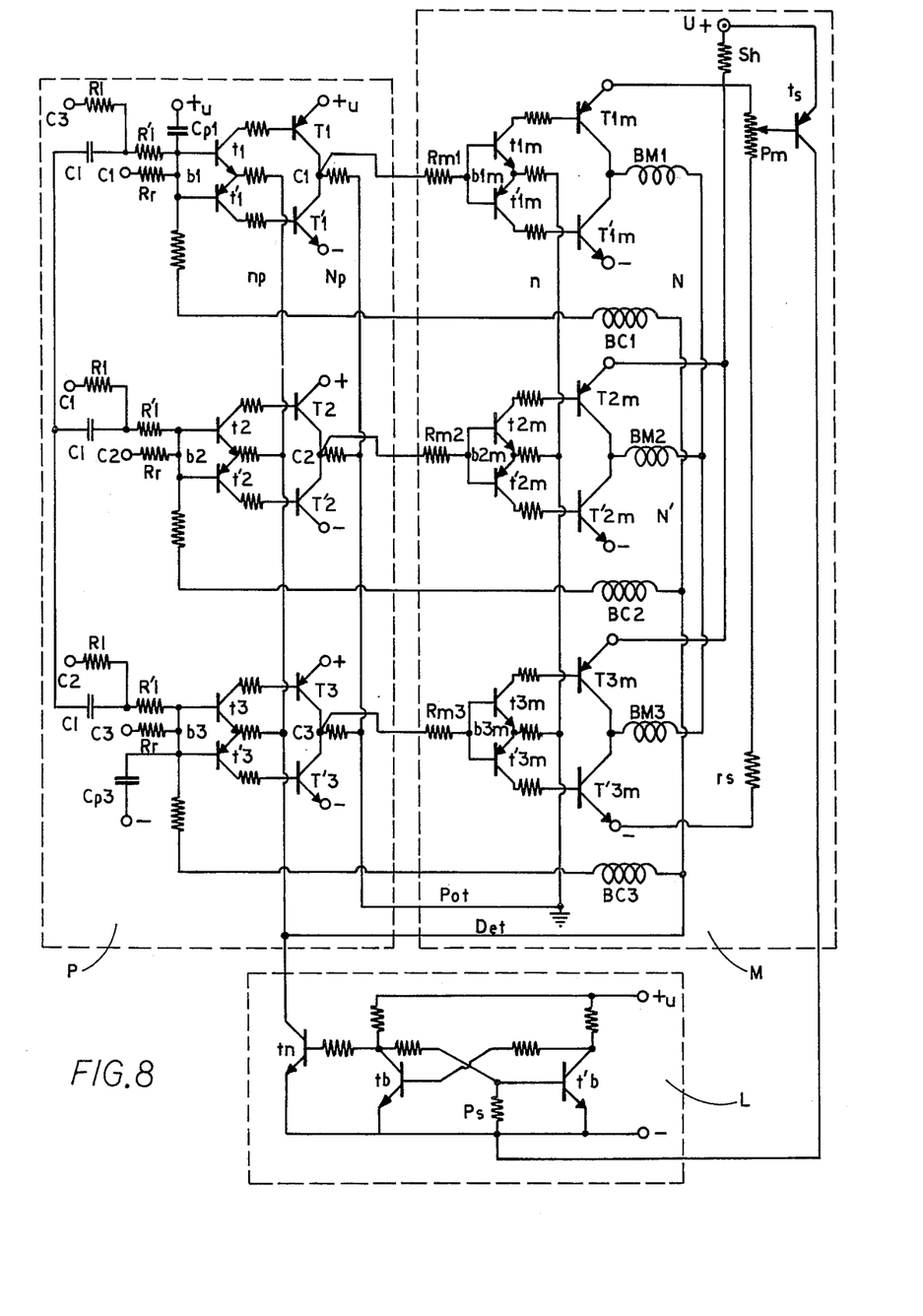
FIG. 8 diagrammatically illustrates a first embodiment of the electronic switching arrangement according to the invention, comprising in three separate sub-assemblies the actual switching circuits, the electronic control triggers and the sequential excitation stage associated therewith, and an intensity-limiting circuit whose function will be explained in detail in the description.

The components previously enumerated, which together form the "static commutator", are grouped into the box P shown in broken lines. This assembly may be fed under a voltage u lower than the feed voltage U of the motor. Accordingly, the commutator could be produced in the form of a miniature integrated circuit which may be standard for all motors.

All the actual switching circuits of the motor and the three motor windings BM1, BM2 and BM3 have been grouped into the box M, switching being controlled through the commutator P by the three star-connected sensor windings BC1, BC2 and BC3.

Since the polarities of the common collectors of the commutator C1, C2 and C3 are those previously indicated, as specified in FIG. 7, it is sufficient to connect these three collectors to the three common bases $b$1M, $b$2M and $b$3M of M to obtain the currents and voltages of the twelve preceding configurations in the windings BM1, BM2 and BM3.

The connections which have to be made for this purpose may be established by the resistors RM1, RM2 and RM3. Their values are high, of the order of 100 to 500 kilo-ohms, when the transistors $t$1M, $t'$1M, $t$2M, $t'$2M, $t$3M and $t'$3M are of the Darlington type.

If the feed voltage u of the commutator is very different from the feed voltage U of the motor, it is advisable to equalise the mean potentials in the box P as in the box M. This may be obtained by connecting the neutral point NP to the intermediate neutral point n of M by the connection Pot.

If the sensor is to act symmetrically, the neutral point N' of the star-connected sensor must also be connected to the intermediate neutral point nP of P, because the latter is connected to the six emitters of the six amplification transistors t of P.

When the motor begins to rotate under the effect of the commutator P, the sensor windings come into action when the speed exceeds the intervention threshold of the sensor. The sensor windings then act by periodically modifying the polarity of the bases b acting through input series resistors $R_{c1}$, $R_{c2}$ and $R_{c3}$ the effect of which is to modify the polarity of the bases bM at the same time.

The motor, which has started as a synchronous motor under the effect of the commutator, then operates as a so-called autosynchronous motor under the effect of the sensor which enables it to accelerate normally. Since the commutator can no longer follow, the inductive sensor takes charge. The torque maintains its maximum value in both cases, because the oscillations go from blocking to saturation in both directions in the normal manner of switching transistors bistable circuits.

In order automatically to limit the current in the motor, chopping may be applied, in particular by acting on the six power transistors TM, chopping being controlled by the increase in voltage at the terminals of a shunt which releases a hysteresis trigger. The function of that trigger is to connect to the negative pole the intermediate neutral point nP of the commutator when the current in the motor exceeds a certain adjustable value. The transistors $t'$ of the commutator then remain blocked, the effect of which is to cut off the current in the motor.

In the circuit shown by way of example in FIG. 8, the voltage corresponding to the limit current is detected by a transistor $t$S whose emitter is connected to the positive pole and whose base is connected to the slide of a potentiometer Pm in series with the shunt Sh, and to the negative pole through the resistor $r$S. The trigger consists essentially of two transistors $tb$ and $t'b$ connected to form a Schmitt trigger, and polarised in such a way that $tb$ is normally saturated whilst $t'b$ is blocked. When the intensity in the motor exceeds the fixed limit value, the conductor tS conducts and carries current to the base of the transistor $t'b$ across the resistor $rs$. This saturates $t'b$ and, hence, blocks $tb$. Since the base of the transistor $tn$ is no longer at earth potential, this transistor conducts, the effect of which is to connect $nP$ to the negative pole and to block switching, as previously explained.

These three transistors which form the actual current limiter and which are thus denoted by the letter L are grouped into a broken-line box in FIG. 8.

Finally, starting of the motor may be further improved by automatically positioning the rotor at rest. In this case, its lead has to be that which corresponds to the position determined by the fixed polarisation and which is designated "initial lead". If this is not the case, the rotor begins by positioning itself at the initial lead when the feed voltage is applied. If the lead at rest differs from the initial lead, an initial rotation is thus obtained, possibly in a direction opposite to the selected direction, which is a disadvantage. This initial rotation, which should not exceed half a turn in the case of a bipolar motor, is quickly checked, although it may appear troublesome. It may be completely prevented by ensuring that the rotor always stops in the same position corresponding to the initial lead. This result may readily be obtained in the majority of cases, for example by providing a fixed magnetised component which acts on the rotor and which is suitably keyed to the stator.

The invention may be used for controlling the operation of brushless variable-output and variable-speed motors. Purely by way of example, one typical application of the first embodiment described above of the electronic switching arrangement according to the invention is constituted by a small electrical motor of 80 W rotating at speeds of the order of 100,000 rpm or even higher, which may be used in dental machinery. However, it is obvious that the invention may be equally well applied to industrial power motors.

Figure 9:
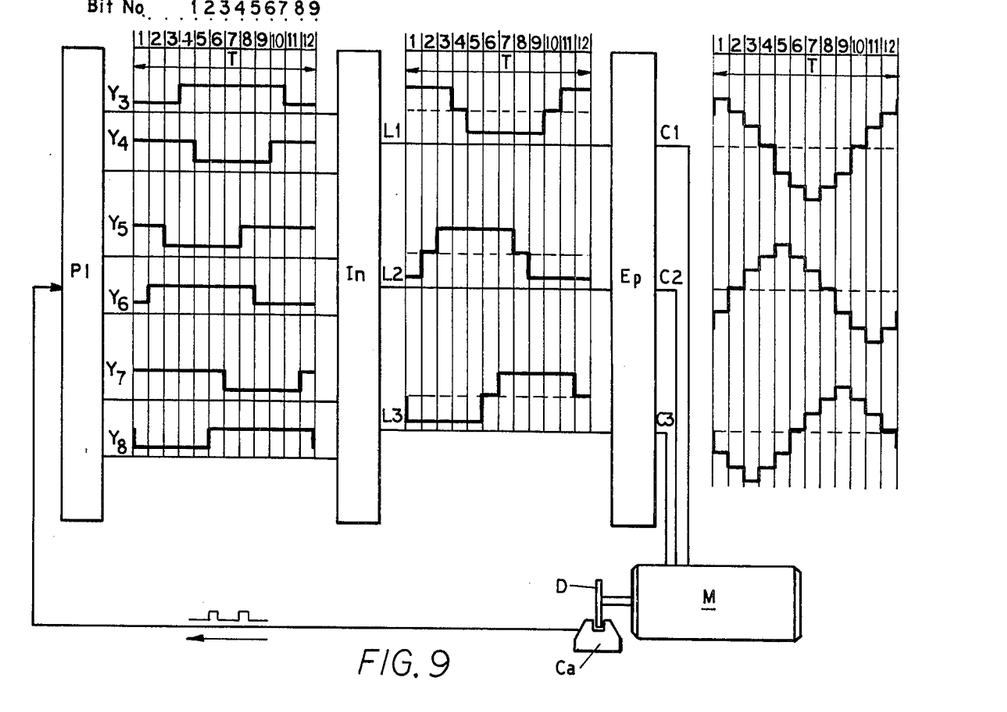
FIG. 9 is a basic circuit diagram of a second embodiment of the electronic switching arrangement according to the invention with the associated motor.

FIG. 9 is a basic circuit diagram of a second embodiment of the electronic switching arrangement according to the invention, this embodiment being based on the use of integrated logic circuits associated with a position and angular speed sensor of the numerical type rather than of the analogue type like the induction sensor used in the preceding embodiment. This second embodiment of the switching arrangement according to the invention is intended in particular for numerically controlled motors for machine tools.

The logic circuits used in this second embodiment are well known in the art, especially those of the TTL series which will be mentioned hereinafter.

They are characterised by the fact that their input or output voltage, or even both, can only assume two values which are conventionally designated 0 and 1 which characterises this conventional, so-called binary logic. From successive pulses, known as "bits" and more generally referred to as "clock signals", it is possible through suitable branches of these circuits to establish voltage stages according to the required law with a view to obtaining the signals with three stable levels required for supplying to the power stage, as explained in the description of the preceding embodiment.

According to FIG. 9 of the drawings, these signals with their three stable levels are formed in an interface In, performing the function of the electronic triggers of the preceding embodiment, from binary signals, i.e. signals with two levels, emitted along six lines Y3 . . . Y8 by a sequential excitation circuit P1 which itself is controlled from pulses or bits emitted at a rate of 12 per cycle in the case under discussion here of three-phase switching and a motor M with a bipolar magnetised rotor by a position and angular speed sensor Ca of the numerical type.

FIG. 9 shows, in the form of superposed diagrams and as a function of time, the respective wave forms on the one hand of the binary signals emitted by the sequential excitation circuit P1 along the six lines Y3 . . . Y8, and on the other hand of the three-level signals formed by the interface In and transmitted along the lines L1 . . . L3 to the power switching stage Ep, and finally of the graduated three-phase substantially sinusoidal voltages formed by the power switching stage for feeding the stator winding of the motor M. In these graphs, the cycle or period T corresponding to one revolution of the rotor of the motor M is divided into 12 equal parts each of which corresponds to a time interval separating two successive bits and which will hereinafter be referred to, in the same way as above, as "configurations", each being identified by a number 1 . . . 12.

The sensor Ca, illustrated very diagrammatically in FIG. 9, consists of two parts. The first part is movable and consists of a disc D mounted on the motor shaft. The second part is normally fixed and formed by such electronic components as transmitters and receivers included in the assembly denoted Ca from which issues the electrical transmission line transmitting the signals to the sequential excitation circuit P1.

Figure 10:
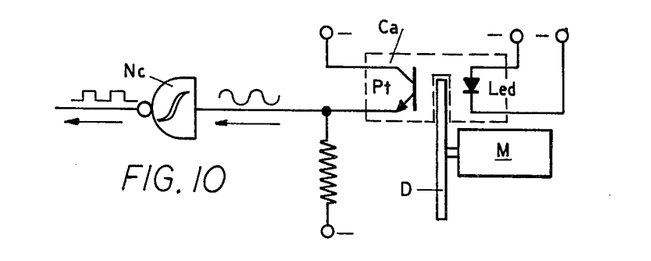
FIG. 10 diagrammatically illustrates an optical position and angular speed sensor which may be used in this embodiment.

The sensor is shown in more detail in FIG. 10 which, by way of example, shows one possible arrangement of an optical sensor Ca. This optical sensor essentially comprises a luminous diode Led which is arranged opposite a phototransistor Pt and which illuminates the sensitive part thereof. Between the two is situated the periphery of a disc D and 12 slots which is mounted on the shaft of the motor M and which is shown in the form of a front view in FIG. 11.

Figure 11:
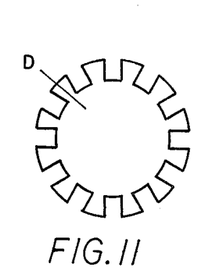
FIG. 11 is a front view of the disc with which the sensor shown in FIG. 10 is equipped.

Since the diode is continually energized each time a slot is situated between it and the phototransistor, the phototransistor moves from the blocked to the saturated state. If the phototransistor is connected in a circuit fed by a voltage source, rotation of the disc thus produces successive pulses. Since the slots in the disc are uniformly distributed over its circumference, these pulses product a current of frequency $f$ equal to 12 $n$ c/s, $n$ being the speed of rotation of the disc and hence of the motor in revolutions per second.

The pulses emitted by the sensor Ca are advantageously processed by passage through a Schmitt NAND gate Nc whose function is to steepen the edges so as to make them suitable for supplying to the TTL circuits forming the sequential excitation stage P1.

Figure 12A:
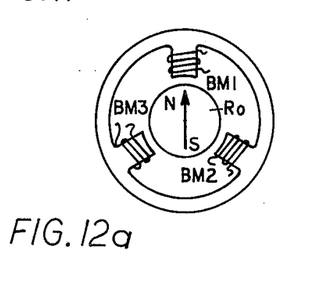
FIGS. 12a and 12b are explanatary diagrams indicating the respective position of the magnetic fields of the stator and rotor of the motor at any given moment.
Figure 12B:
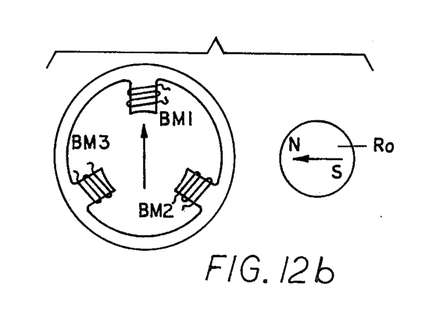

The motor M is diagrammatically illustrated in FIG. 12. The stator simply consists of 3 coils BM1, BM2 and BM3 arranged at 120° intervals from one another. The rotor is a cylinder Ro diametrically magnetised and comprising a pair of poles. The stator field, represented by an arrow in FIG. 12$b$, makes one turn per motor cycle. It turns through 30° each time a slot in the disc passes the fixed part of the sensor.

In the case of configuration 1 which corresponds, for example, to the connection of the coil BM1 to the + terminal of the d.c. voltage source and to the connection of the coils BM2 and BM3 to the - terminal, these three coils being assumed to be star-connected, the resulting field of the coils BM is directed downwards, as indicated in FIG. 12b by means of a vertical arrow. This field applies the maximum torque to the rotor Ro if the rotor field is itself orthogonal to the stator field, in other words if it is angularly offset by 90°, as indicated in FIG. 12b by means of a horizontal arrow.

If the sensor is then connected, the stator and rotor fields having the angular positions indicated, the rotor now released will turn to position itself at 90°. During its rotation, bits are emitted, their effect being to turn the stator field to the same extent. The rotor thus follows the stator field without ever joining it. In other words, the motor rotates, in this case in the time direction.

The relative lead of these two fields, in this case approaching 90°, may be obtained in different ways. In particular, it is possible in accordance with the invention automatically to obtain this relative lead with purely electronic means by quasi-instantaneously emitting three bits which thus make the stator field turn through 90° once the energized stator has positioned the rotor. Due to the inertia of the rotor, this emission does not have any immediate effect upon the angular position of the rotor or, hence, upon the angular position of the disc, but it sets the direction of rotation.

It is also possible in accordance with the invention to optimise the lead of the sensor by turning the motor stator to set it somewhat askew relative to the fixed part of the sensor about the axis of the motor.

There will now be described an exemplary embodiment of the sequential excitation circuit P1 based on the use of TTL circuits and, more especially, shift registers.

Figure 13:
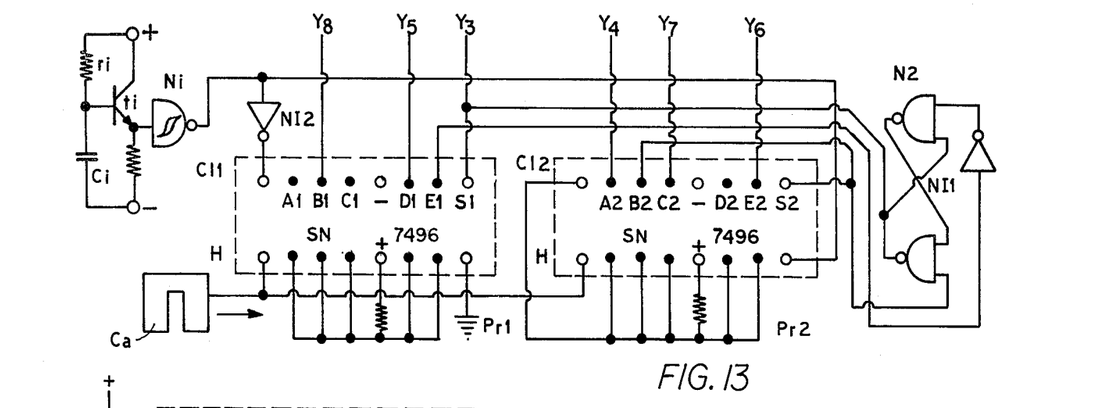
FIG. 13 shows how the sequential excitation stage is formed by means of two registers of a commercially available type.

FIG. 13 shows two SN 74 96 registers with 5 outputs. The signals from the sensor are simultaneously supplied to the clock inputs H of the two circuits. The six outputs Y3, Y4, Y5, Y6, Y7 and Y8 are made respectively at S1 ("serial 1"), A2, D1, E2, C2 and B1. The outputs E1 and B2 are successively applied to the inverting gate NI1 and the NAND gates N1 and N2 which react on ther serials S1 and S2 of the two circuits, as explained hereinafter.

When voltage is applied, the input C11 ("CLEAR") is set to the level 1, the effect of which is to set the outputs A1, B1, C1, D1 and E1 at the level O, whilst the input Pr2 ("PRESET") is set at the level 1, the effect of which is to set the outputs A2, B2, C2, D2 and E2 at the level 1. The outputs Y3 and Y4 are thus at the level 1, whilst Y5 and Y6 are at the levels 0 and 1, respectively, whilst Y7 and Y8 are at the levels 1 and 0, respectively. This corresponds to configuration number 4, as specified in the graph shown in FIG. 9.

This "initialisation" may take place automatically by virtue of the delay circuit on the left-hand side of FIG. 13. When the power is applied, the capacitor Ci is discharged and the emitter of the transister ti is thus at the level 0. The NAND gate Ni thus has its input at the level 0 and its output at the complementary level 1. On the other hand, Pr2 is at the level 1. Finally, C12 is at the level 1 and only acts to rest the outputs 2 to 0. In addition, due to the gate N12, C11 is at the level 0, the effect of which is to reset to the level 0 the outputs A1 to E1 of the SN 7496 register shown on the left-hand side of FIG. 13.

However, when the capacitor Ci is charged through the resistor ri, so that the transistor ti becomes conductive, the gate Ni switch-over. C11 moves to the level 1 and no longer resets the outputs A1 to E1 systematically to the level 0. On the otherhand, Pr2 moves to the level 0 and, since C12 is at the level 1, the outputs A2 to E2 of the SN 7496 register situated on the right-hand side of FIG. 13 are not longer systematically reset to the level 1.

The two registers are operative, the starting configuration being the fourth, as previously indicated. The stator field in thus initially positioned at 120° from the vertical in a closewise direction. If the rotor, i.e. the rotor field, lags by 90°, in other works if it is positioned at 30° from the vertical in a clockwise direction, the motor will rotate in the same direction. Since the disc is thus driven on the arrival of the first bit emitted, the output A1 moves to the level 1.

On the arrival of the following bit, it is the turn of the output D1 to move from 0 to 1. On the arrival of the following bit, it will be the turn of C1 and, on the arrival of the fifth bit, the turn of E1 to move from 0 to 1.

In the second register, on the arrival of the first bit emitted by the sensor and received at H, it is A2 which moves from the level 1 to the level 0 and, hence, Y4 as well, as may be verified from the left-hand graph in FIG. 9.

On the arrival of the following bit, it will be the turn of B2 to move from the level 1 to the level 0 and so on up to the fifth bit, where it will be the turn of E2 and hence Y6 to move from the level 1 to the level 0.

When, in the first register, the last output E1 moves from the level 0 to the level 1, S2 moves to the level 1, enabling the outputs 2 to return to the level 1. When E1 moves to the level 1, the gate N1 is simultaneously prepared for oscillation. However, the outputs 1 are still unable to return to the level 0.

On the arrival of the sixth bit, A2 and hence the output Y4 return to the level 1.

On the arrival of the seventh bit, B2 returns to the level 1 which makes the gate NI1 and, hence, N2 and N1 oscillate simultaneously. S1, which was at the level 1, moves to the level 0, as does Y3. The outputs 1 are now able to return to the level 0.

This is what happens on the arrival of the eighth bit where A1 falls back to the level 0. On the arrival of the ninth bit, it will be the turn of B1 and hence Y8 to return to the level 0, and so on in the first register up to arrival of bit number 12, after which the cycle begins again on the arrival of the following bit numbered 1.

One feature of the system described by way of example above and, hence, of the invention is that, on the arrival of each bit, a change in level takes place in each of the six lines Y3 . . . Y8.

Another feature of the invention is that, in each pair of lines Y3 and Y4 for example, the signals are never simultaneously at the level 0. This feature provides for the ready passage to three stable states.

This passage takes place by means of an interface in connected to the output of the sequential excitation circuit P1, as indicated diagrammatically in FIG. 9. One possible embodiment of this interface is shown by way of example in FIG. 14a. It uses opto-electronic couplings each comprising a luminous diode led and a phototransistor Pt.

Figure 14A:
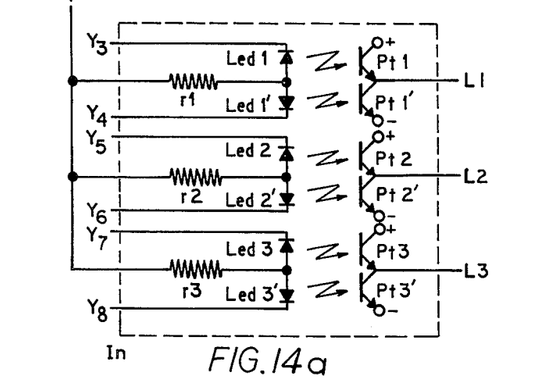
FIG. 14a is a circuit diagram of an interface with 6 inputs and 3 outputs which may perform the function of electronic triggers with three stable positions, whilst

Two diodes whose cathodes are connected respectively to each line of one pair are arranged in each of the three phases. Thus, the diodes Led1 and led'1 have their cathodes connected to Y3 and Y4, respectively. The anodes are interconnected in each phase and are connected to the positive pole by a resistor r, which is denoted r1 in the phase 1.

In view of the connection of the 6 phototransistors Pt1, Pt'1, Pt2, Pt'2, Pt3 and Pt'3, the lines such as L1 are positive when Pt1 is saturated, and hence Led1 illuminated (symbol *); they are negative when Led1 is out (symbol .) and Led'1 illuminated.

Figure 14B:
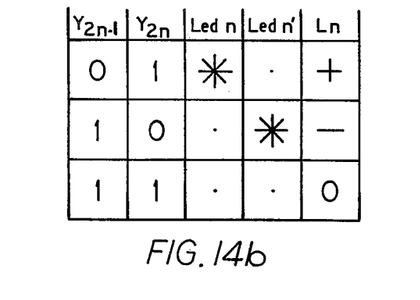
FIG. 14b is a table explaining how it functions.

According to the level of the even and odd lines Y, the lines L will thus have the polarity in the table in FIG. 14b. Thus, each of them, like the outputs of the electronic triggers of the first embodiment, may assume one or other of three stable levels: +, 0 and −, and, hence, may control the operation of one of the phases of the power switching stage Ep.

It is obvious that the arrangements and connections described by way of example above are by no means the only ones which enable the result sought by the invention to be obtained.

Figure 16:
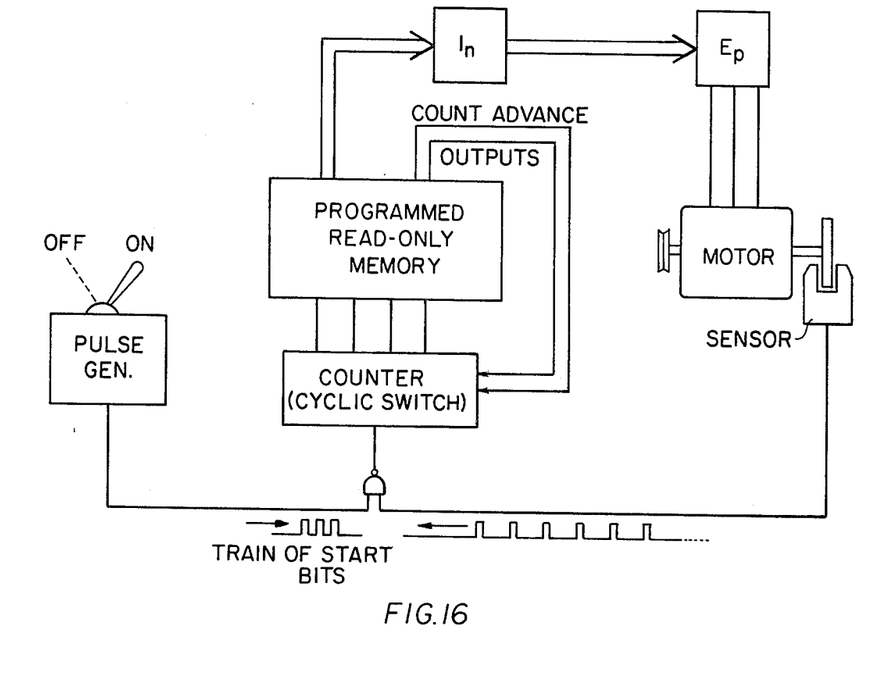
FIG. 16 is a block diagram of an embodiment of the invention in which the switching stages are processed by a programmed read-only memory.

It may similarly be obtained with counters and decoders or even with memories, especially with standard PROM memories which are readily programmed. Better still, it is possible as shown in FIG. 16, to establish a special memory, still programmed, which processes the switding stages from the bits emitted by the sensor. These memory controlled systems are symbolically diagrammed in FIG. 16.

In every case, irrespective of the logic used, feeding of the motor necessitates certain obvious precautions so as to prevent any excess currents which could adversely affect the stability of the semiconductors used. This is particularly the case when it is desired to be able directly to connect the motor to a storage battery. In that case, an automatic current limiter has to be provided.

Figure 15:
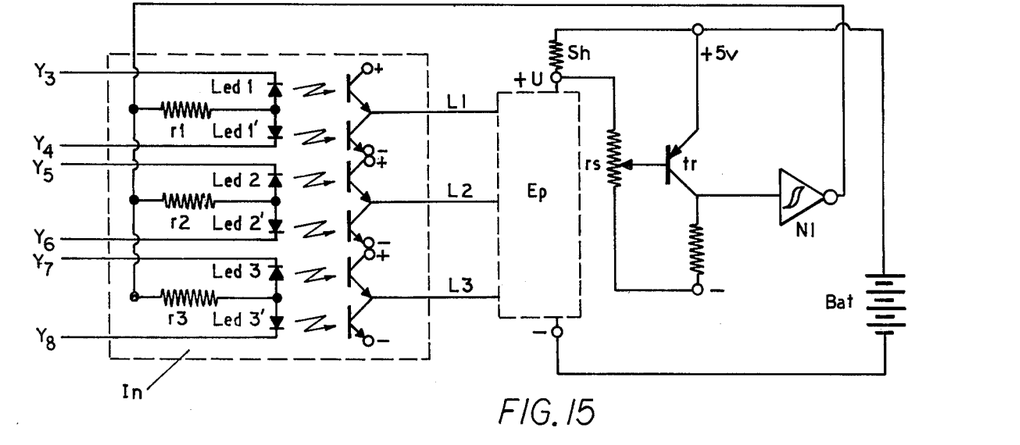
FIG. 15 diagrammatically illustrates a current limiting circuit associated with the second embodiment of the electronic switching arrangement according to the invention.

To this end, it is possible, as illustrated diagrammatically in FIG. 15 of the drawings, to adapt the current-limiting circuit which has already been described in reference to FIG. 8 and which operates by chopping or temporarily interrupting the feed of the six diodes Led of the interface In.

To enable the diodes Led1, Led'1, Led2, Led'2, Led3, Led'3 to be illuminated, the voltage by which they are fed across the resistors r1, r2 and r3 must be positive, as already explained in reference to FIG. 14a. Accordingly, it is sufficient to provide a means for interrupting this feed when the average current feeding the motor exceeds a certain value.

According to the invention, this is achieved by feeding the power stage, i.e. the motor, through a resistor Sh of a fraction of an ohm connected in series with a resistor rs to the terminals of the power supply of a regulation system that provides a voltage of 5 V. A pnp transistor connected to the terminals of this source has its base connected to a slide adjustable across rs. When the base-emitter voltage of the transistor exceeds a certain value, the transistor begins to conduct. It is sufficient to connect its output to an inverting Schmitt gate Ni to make it supply a positive current feeding the diodes while tr remains blocked. As soon as it begins to conduct, the gate switches over and the supply of current to the diodes, and hence to the motor, is cut.

A similar circuit arrangement, which is also included within the scope of the present invention, may be used for regulating the motor. A digital analogue converter, whose input is connected to the sensor, processes an analogue signal at its output in the form of a voltage increasing with speed. In this case, regulation is obtained by connecting this output to the base of the transition tr of FIG. 15.

We claim:

1. An electronic switching arrangement for feeding from a direct-current source an electric motor having a stator with a polyphase winding, and a rotor equipped with means thereon for maintaining a permanent magnetic field, said motor also having means for sensing angular position and speed of said rotor and for generating electric signals representative of said position and speed and distributing signals so generated in turn to a number of outputs equal to the number of phases of said stator winding, said arrangement comprising:

means for producing, in response to said signals generated by said sensing means, a set of three-level stepped control waves of a period equal to one revolution of said motor and of respective phases mutually displaced by the same angular separation as the phases of said stator winding, each three-level wave being supplied at a separate output which at one of the three levels is a positive voltage, at another of said levels is zero voltage and at the other of said levels is a negative voltage, with the zero voltage level portions of said wave having the duration of the interval between two successive signals of said sensing means and being equally spaced in phase, and the portions of each said wave following any two successive zero level portions thereof being of different voltage polarity;

semiconductor power switching means responsive to each stepped wave output of said wave producing means and providing switching paths for the respective phases of said stator winding, providing to said respective phases of said winding a positive, zero or negative applied voltage at a terminal connection thereof corresponding to the level of the stepped wave at the input of said power switching means for the phase, whereby a system of polyphase bi-directional currents in alternating shaped waves of at least three levels of magnitude in each direction in addition to a zero level step, and approximately sinusoidal in form, is produced in the winding of said stator, having a frequency and phase angle respectively determined by the speed of the rotor of the motor and its position relative to the stator when the motor is running after initial acceleration, and a sequential excitation circuit means for operation at low frequency independently of the speed of the rotor for starting and initially accelerating the motor by providing excitation pulses to said control wave producing means when power is applied to said electronic switching arrangement and to said motor, said sequential excitation circuit being subject to being overridden by the signals produced by said sensing means at motor speeds above a threshold speed and to becoming incapable of effecting said wave producing means at motor speeds above said threshold speeds, the outputs of said sequential excitation circuit means being supplied to the same inputs of said control wave producing means to which said signals generated by said sensing means are supplied.

2. An electronic switching arrangement for feeding an electric motor as defined in claim 1, in which means for limiting the average current in said motor are provided which comprise:

current-sensitive means (Sh, Rs, Tr, $t_s$) for producing an electrical signal representative of the average current flowing through said motor, and semiconductor trigger means (L, NI) responsive to the electrical signal produced by said current-sensitive means and connected to the means for producing stepped control waves for blocking said control wave producing means in such a way as to cause all said semiconductor power switching means to be put into their respective conditions for providing zero voltage to all the phases of said stator winding whenever the signal of said current-sensitive means represents an average current exceeding a predetermined value until the effect of said trigger means causes a change in said signal sufficient to restore said trigger means to its previous condition.

3. An electronic switching arrangement for energizing, from a direct-current source, and electric motor having a stator with a polyphase winding ($BM_1$, $BM_2$, $BM_3$), a shaft, and a rotor on said shift equipped with means on said rotor for maintaining a permanent magnetic field, said motor also having inductive means including coils ($BC_1$, $BC_2$, $BC_3$) disposed about said shaft in a manner similar to the phases of said stator winding, having a predetermined and consistent angular relation thereto about said shaft and having an output corresponding to each phase of said stator winding for sensing angular position and speed of said rotor and for generating electrical signals representative of said position and speed, said arrangement comprising, for each phase of the stator winding:

semiconductor power switching means ($tM$, $t'M$, $TM$, $T'M$) providing paths for selectively de-energizing said phase and energizing it in each of two opposed polarities of current flow and having control paths for selection of said switching paths, and semiconductor control circuit means ($t$, $t'$, $T$, $T'$) interconnected with the output of said sensing means corresponding to such phase and with a passive reactive network ($R_1$, $R'_1$, $C_1$, $R_r$) for introducing an input signal from the semiconductor control circuit means of the preceding phase in the direction of motor operation and for supplying an output signal to the semiconductor control circuit means of the succeeding phase, said semiconductor control circuit means being a trigger circuit having an output having three stable signals levels connected to the control paths of said semiconductor power switching means so that the respective levels of said three-level output cause the semiconductor power switching means to which said output is supplied to provide respectively positive voltage, zero voltage and negative voltage to said phase of said stator winding and to cause said semiconductor power switching means to energize said phase in each of two opposed polarities of current flow, said passive reactive networks being connected to passive circuit elements ($R_{p1}$, $R_{p2}$, $C_{p1}C_{p3}$) for operation of said motor, upon application of power to said motor and said switching arrangement, from a resting start to a threshold speed at and above which operation is provided by said outputs of said sensing means.

4. An electronic switching arrangement for energizing an electric motor as defined in claim 3, in which there are also provided current limiting means, comprising:

current-sensitive means comprising a resistive network (Sh, Pm, $rs$) and a transistor ($t_s$) for producing an electrical signal representative of the total current flowing through said motor, and semiconductor trigger means ($t_b$, $t'_b$, $t_n$) responsive to the electric signal produced by said current-sensitive means and connected to the semiconductor control circuit means of all of the phases of said stator winding for causing all said semiconductor power switching means to be put into their respective conditions in which they apply zero voltage to said stator winding whenever said signal of said current-sensitive means represents a current exceeding a predetermined value until the effect of said trigger means changes said signal sufficiently to restore said trigger means to its previous condition.

5. An electronic switching arrangement for energizing an electric motor as defined in claim 3, in which said semiconductor control circuit means are trigger circuits respectively having outputs of which the three stable levels are a positive voltage level, zero voltage and a negative voltage level.

6. An electronic switching arrangement for energizing an electric motor as defined in claim 4, in which said semiconductor control circuit means are trigger circuits respectively having outputs of which the three stable levels are a positive voltage level, zero voltage and a negative voltage level.

7. An electronic switching arrangement for energizing an electronic motor as defined in claim 3, in which said motor has a stator with a 3-phase winding and in which the magnetic field maintaining means of said rotor is a ferrite ring magnetized to provide 8 symmetrically distributed alternate magnetic poles.

8. An electronic switching arrangement for energizing an electric motor as defined in claim 4, in which said motor has a stator with a three-phase winding and in which the magnetic field maintaining means of said rotor is a ferrite ring magnetized to provide eight symmetrically distributed alternate magnetic poles.

9. An electronic switching arrangement for energizing an electric motor as defined in claim 3, in which each of the semiconductor control circuit means ($t$, $t'$, $T$, $T'$) comprises two pairs of transistors, each pair composed of transistors of complementary types, a first pair ($t$, $t'$) of said pairs constituting an input stage and consisting of transistors coupled in parallel by their bases and their emitters, and a second pair ($T$, $T'$) of said pairs constituting an output stage and having their collectors connected to an output connection of the control circuit means and their emitters connected respectively to the two terminals of a d.c. voltage source, the bases of the output pair of transistors being respectively connected in circuit with the collectors of the input pair of transistors, and a resistor ($R_r$) being connected between the common point of the collectors of the output transistors and the common point of the bases of the input transistors for providing the feedback required for trigger effect.

10. An electronic switching arrangement for energizing an electric motor as defined in claim 9, in which said reactive elements connected for providing a starting operation of said motor or capacitors ($C_{p1}$, $C_{p3}$)

connected between the respective inputs of at least two of said semiconductor control circuit means and, respectively, the two terminals of the d.c. voltage source for causing the control circuit means to produce an initial movement of the rotor of the motor in the required direction of rotation when power is applied to the motor and to the electronic switching arrangement.

11. An electronic switching arrangement for energizing an electronic motor as defined in claim 10, in which the passive reactive network of each semiconductor control circuit means consists of two series resistors ($R_l$, $R'_l$) connected between the common point of the bases of the input transistors of the semiconductor control means and the common point of the collectors of the output transistors of the semiconductor control means of another phase, the other phase being in each case in the same sense with respect to the direction of rotation of the rotor of the motor, and a capacitor ($C_1$) connected between the common point of said series resistors and an insulated junction point with the corresponding terminal of the similarly connected capacitors of the other semiconductor control circuit means.

12. An electronic switching arrangement for energizing an electric motor as defined in claim 4, in which said current-sensitive means comprises a resistor through which the current for all phases of the stator winding flows and an adjustable voltage divider in series with said resistor in shunt with the supply of power to said stator winding and to said semiconductor power switching means and means for providing an electric signal responsive to the voltage at the tap of said adjustable voltage divider, and in which said semiconductor trigger means of said current-limiting means is a trigger circuit having hysteresis connected to be switched when the voltage at said voltage divider tap falls below a predetermined threshold, said trigger means being arranged to block the semiconductor control circuit means in response to the voltage at said voltage divider tap passing below said threshold.

13. An electronic switching arrangement for energizing an electric motor as defined in claim 3, in which a series input resistor (RM) is provided at the input of each of said semiconductor power switching means for connection to the output of the corresponding semiconductor control circuit means, in which also each of said semiconductor power switching means comprises a pair of input transistors of complementary type and a pair of output transistors of complementary type, the emitters of the input pair of transistors being connected together and the respective collectors thereof being connected in circuit with the bases of the respective transistors of the output pair of transistors, the bases of the input pair of transistors being connected together and to their said input resistor, and in which, further, a common potential link (Pot) is provided which connects together through individual isolating resistors, the outputs of each of said semiconductor control circuit means and the respective common emitter connections of the input pair of transistors of said semiconductor power switching means.

14. An electronic switching arrangement for energizing an electric motor as defined in claim 9, in which a resistor ($R_c$) is provided between the output for each phase of said inductive sensing means and the input of the corresponding semiconductor control circuit means, in which, further, said inductive sensing means has a neutral point connection, and in which a common detection link (Det) it is provided connecting, through individual isolating resistors, the common emitter connection of the input pair of transistors of each of said semiconductor control circuit means.

15. An electronic switching arrangement for energizing an electric motor as defined in claim 3, in which the motor is provided with a magnetized component set in the stator of the motor for automatically returning the rotor of the motor to its starting position when the motor is de-energized, whereby initial return of the rotor towards the angular starting position imposed by the first switching-over of the semiconductor control circuit means is prevented.

16. An electronic switching arrangement for energizing a motor as defined in claim 3, in which the coils ($BC_1,BC_2,BC_3$) of said inductive sensing and generating means are respectively located between the phases of said stator winding and operated in response to the magnetic field of a magnetized rotor which is the said rotor of said motor.

17. An electronic switching arrangement for energizing, from a direct-current source, an electric motor having a stator with a polyphase winding ($BM_1,BM_2,BM_3$) and a rotor (Ro) having means thereon for maintaining a permanent magnetic field, said arrangement comprising:

means (D,Ca), including a component (D) mechanically coupled to said rotor, for sensing angular position and speed of said rotor and for generating electric signals representative of said position and speed;

digital logic circuit means (P1,In) for processing said signals, said signals generated by said sensing and generating means including a continuous sequence of pulses regularly spaced in time providing for each revolution of the motor an even number of pulses sufficient to derive therefrom in said digital logic means by binary logic circuits a set of output stepped voltage waves having one stepped level on each side of a median stepped value, the number of stepped waves and outputs therefor corresponding to the number of phases of said stator winding, said digital logic circuit means including binary logic means for producing said stepped waves at separate outputs therefor in response to said train of pulses in such form that the median stepped level portions are spaced at equal input pulse count intervals in each of said waves and have a duration corresponding to the pulse repetition period of said sequence of pulses, the time off-set between the median stepped level portions of the respective waves corresponding to the angular offset of the phases of the stator winding;

said arrangement further comprising, for each phase of the stator winding, semiconductor power switching means respectively responsive to each of said stepped waves for providing switching paths for selectively applying to each of said phase windings a voltage having three stable values, respectively at a positive voltage, zero voltage and a negative voltage, and electronic motor start means, including a delay circuit, for causing said digital logic circuit means to produce an output for operating said semiconductor power switching means in a sequence timing unaffected during a start-up period by said signals of said sensing and generating means, for starting said motor after application of power to said electronic switching arrangement and to said motor.

18. An electronic switching arrangement for energizing an electric motor as defined in claim 17, in which there are also provided current-limiting means comprising:

current-sensitive means comprising a resistive network (Sh, rs) and a transistor (tr) for producing an electrical signal representative of the total current flowing through said motor, and semiconductor trigger means (NI) responsive to the electric signal produced by said current-sensitive means and connected to said digital logic circuit means (In) for causing all said semiconductor power switching means ($E_P$) to be put into their respective conditions in which they apply zero voltage whenever said signal of said current-sensitive means represents a total current exceeding a predetermined value until the effect of said trigger means changes said signal sufficiently to restore and trigger means to its previous condition.

19. An electronic switching arrangement for energizing an electric motor as defined in claim 17, in which said polyphase winding of said stator is a three-phase winding and in which said rotor (Ro) is a bipolar rotor.

20. An electronic switching arrangement for energizing an electric motor as defined in claim 18, in which said polyphase winding of said stator is a three-phase winding and in which said rotor (Ro) is a bipolar rotor.

21. An electronic switching arrangement for energizing an electric motor as defined in claim 18, in which said motor start means is in the form of an integrated logic circuit.

22. An electronic switching arrangement for energizing an electric motor as defined in claim 21, in which said motor start means is in the form of a PROM memory.

23. An electronic switching arrangement for energizing an electric motor as defined in claim 21, in which said digital logic circuit means and said motor start means are provided in the form of a collection of integrated logic circuits, including a group (P1) having a set of inputs to which signals generated by said sensing and generating means are supplied at a set of outputs (Y3,Y4,Y5,Y6,Y7,Y8) providing binary output wave signals supplied to means ($I_n$) for combining these outputs in pairs to produce half as many outputs ($L_1,L_2,L_3$) for supplying said three-level stepped waves to said semiconductor power switching means connected to the respective phases of said stator winding.

24. An electronic switching arrangement for energizing an electric motor as defined in claim 23, in which said polyphase winding of said stator is a three-phase winding, and in which, further, said group of integrated logic circuits has six outputs and in which, by virtue of said binary logic means, each pulse of said sequence of pulses produces a transition in the voltage level of a signal on one and only one of said six outputs.

25. An electronic switching arrangement for energizing an electric motor as defined in claim 24, in which when the repetition period of the pulses of said sequence is referred to as a bit, the intervals between the transitions of said rectangular waves are in each case alternately 5 and 7 bits, and in which the pairs of outputs of said integrated circuit group which are combined in said combining means ($I_n$) have respective waves at which only one of the two voltage levels (the higher or the lower) exists simultaneously on both outputs of the pair.

26. An electronic switching arrangement for energizing an electric motor as defined in claim 24, in which said combining means into which the outputs of said group of integrated logic circuits (P1) is supplied comprises an opto-electronic coupling between each of said outputs and a combining circuit in which the photosensitive elements of two of said couplings are energized in series and the junction between the two of them provides an output for supplying a three-level stepped wave to the semiconductor power switching means for one phase of said polyphase winding.

27. An electronic switching arrangement as defined in claim 23, in which said motor start means are provided in the form of integrated logic circuits constituting means for automatically and substantially instantaneously emitting a sequence of three pulses when a voltage is applied thereto and supplying the same to said previously mentioned group of integrated logic circuits (P1), and in which the electronic lead thus provided for starting the motor is optimized by setting the angular position of said component (D) of said sensing and generating means which is mechanically coupled to the rotor of said motor relative to said rotor.

28. An electronic switching arrangement for energizing an electric motor as defined in claim 23, in which said polyphase winding is a three-phase winding and said rotor is a bipolar rotor and in which said sensing and generating means is constituted to produce a square wave of twelve cycles per revolution of the rotor.

29. An electronic switching arrangement for energizing an electric motor as defined in claim 28, in which said sensing and generating means includes a Schmitt gate for shaping output signals into steep-edged square wave pulses.

* * * * *

UNITED STATES PATENT AND TRADEMARK OFFICE
CERTIFICATE OF CORRECTION

PATENT NO. : 4,027,213
DATED : May 31, 1977
INVENTOR(S) : de Valroger

It is certified that error appears in the above-identified patent and that said Letters Patent are hereby corrected as shown below:

Claim 1, line 44 the word -- shaped --, should be -- stepped --

Claim 26, line 18, the word -- into -- should be written as -- ($l_n$) to --.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*